United States Patent
Ko et al.

(10) Patent No.: US 7,767,327 B2
(45) Date of Patent: Aug. 3, 2010

(54) METHOD OF ACTIVATING VEHICLE FUEL CELL

(75) Inventors: Jae Jun Ko, Bucheon-si (KR); Hwan Soo Shin, Uiwang-si (KR); Young Min Kim, Dongducheon-si (KR); Sae Hoon Kim, Yongin-si (KR)

(73) Assignee: Hyundai Motor Company (KR)

( * ) Notice: Subject to any disclaimer, the term of this patent is extended or adjusted under 35 U.S.C. 154(b) by 915 days.

(21) Appl. No.: 11/603,872

(22) Filed: Nov. 22, 2006

(65) Prior Publication Data

US 2007/0134522 A1    Jun. 14, 2007

(30) Foreign Application Priority Data

Dec. 9, 2005    (KR)    ........................ 10-2005-0120743

(51) Int. Cl.
*H01M 8/04*    (2006.01)
(52) U.S. Cl. .............................. 429/13; 429/12; 429/22
(58) Field of Classification Search .................... 429/13, 429/12, 22
See application file for complete search history.

(56) References Cited

U.S. PATENT DOCUMENTS

2004/0137292 A1* 7/2004 Takebe et al. ................. 429/23
2005/0260463 A1* 11/2005 Chapman et al. .............. 429/13

\* cited by examiner

*Primary Examiner*—Jane Rhee
(74) *Attorney, Agent, or Firm*—Morgan, Lewis & Bockius LLP

(57) ABSTRACT

The method of activating a vehicle fuel cell for ensuring maximum performance, improves performance of a polymer electrolyte membrane fuel cell, reduces a hydrogen usage, and has stable performance after manufactured. The method includes: placing a fuel cell in an activation device so as to be activated; changing a humidification state of a humidifier which supplies vapor to the fuel cell and a state of a cooling water; supplying a reactant gas to the fuel cell and maintaining a no-load state; maintaining a load state while changing a flow rate of the vapor and gas supplied to the fuel cell; changing the sate of the fuel cell to the no-load state, and re-supplying the reactant gas to the fuel cell; and comparing data measured when the fuel cell operates in the no-load state and data measured when the fuel cell operates in the load state respectively with a reference value.

6 Claims, 4 Drawing Sheets

METHOD OF ACTIVATING VEHICLE FUEL CELL

CROSS-REFERENCE TO RELATED PATENT APPLICATION

This application claims the benefit of Korean Patent Application No. 10-2005-0120743, filed on Dec. 9, 2005, in the Korean Intellectual Property Office, the disclosure of which is incorporated herein in its entirety by reference.

BACKGROUND

The method of activating a vehicle fuel cell improves performance of a polymer electrolyte membrane fuel cell, to ensure maximum performance, reduces hydrogen usage, and stabilizes performance after manufacture.

In general, a fuel cell includes an electrode in which an electrochemical reaction occurs, an electrolyte membrane which transfers hydrogen ions generated by the electrochemical reaction, and a separator which supports the electrode and the electrolyte membrane.

Recently, polymer electrolyte membrane fuel cells have been introduced for use as vehicle fuel cells. In comparison with other types of fuel cells, the polymer electrolyte membrane fuel cell has an excellent efficiency, a high current density, a high output density, and a short start-up time. In addition, since a solid electrolyte is used, corrosion and electrolyte control are not necessary in such polymer electrolyte membrane fuel cells. Furthermore, the polymer electrolyte membrane fuel cell is an environmentally friendly power source in which only pure water is discharged as an exhaust gas. Therefore, the polymer electrolyte membrane fuel cell is currently being researched worldwide in the automobile industry.

The polymer electrolyte membrane fuel cell generates water and heat through an electrochemical reaction between hydrogen and oxygen. Supplied hydrogen is decomposed into hydrogen ions and electrons by a catalyst in an anode electrode. The decomposed hydrogen ion is transferred to a cathode electrode through an electrolyte membrane, and is combined with supplied oxygen and the electrons transferred through an external conductive wire to generate water, thereby generating electronic energy.

In this case, an ideal electrical potential is about 1.3V, and can be expressed as a following chemical reaction equation.

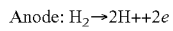
Anode: $H_2 \rightarrow 2H^+ + 2e$

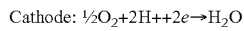
Cathode: $\frac{1}{2}O_2 + 2H^+ + 2e \rightarrow H_2O$

In practice, a vehicle fuel cell requires an electrical potential higher than the above electrical potential. To obtain a higher electrical potential, individual unit cells have to be laminated together until a desired electrical potential is achieved. The unit of laminated cells is referred to as a stack.

A fuel cell electrode is made by combining a hydrogen ion carrier such as nafion with a catalyst such as platinum. If an electrochemical reaction occurs when a fuel cell is initially driven after the fuel cell is manufactured, the fuel cell becomes less activated. This is because a reactant cannot reach the catalyst since a reactant passage is blocked, the hydrogen ion carrier such as the nafion, which forms a triple phase boundary with the catalyst, is not easily hydrated at an initial driving stage, and a continuous movement of hydrogen ion and electrons is not ensured. For these reasons, an activation process is required so as to ensure a maximum performance of a fuel cell after the fuel cell is assembled using a membrane electrode assembly and a separator.

The purpose of the activation process is to activate a non-reactive catalyst and to sufficiently hydrate an electrolyte included in an electrolyte membrane and an electrode, thereby ensuring a hydrogen ion passage. The activation process is carried out so that the fuel cell can reach its maximum performance after assembly. This may take a number of hours or days based on driving conditions. When the activation process is not properly performed, the fuel cell may not operate at its maximum performance.

Fuel cell manufacturers have their own methods of activating a fuel cell. In a typical activation method, the fuel cell is driven for a long time under a specific voltage. In the conventional method of activating a fuel cell, the fuel cell is exposed to a low voltage for a long time, so that the fuel cell can be activated even in a portion where its stack performance is no longer improved.

Disadvantages of the conventional method lie in that time efficiency decreases since it takes a long time for a fuel cell to reach its maximum performance. Furthermore, it takes a long time for the fuel cell to be completely manufactured after a stack is manufactured. In addition, excessive hydrogen and air are consumed while the fuel cell is driven, thereby decreasing price competitiveness.

SUMMARY

In order to address the above described problems, the present invention provides a method of activating a vehicle fuel cell for ensuring optimum fuel cell performance.

According to an aspect of the invention, there is provided a method of activating a vehicle fuel cell including: placing a fuel cell in an activation device so as to be activated; changing a humidification state of a humidifier which supplies vapor to the fuel cell and a state of cooling water; supplying a reactant gas to the fuel cell and maintaining a no-load state; maintaining a load state while changing a flow rate of the vapor and gas supplied to the fuel cell; changing the sate of the fuel cell to the no-load state, and re-supplying the reactant gas to the fuel cell; and comparing data measured when the fuel cell operates in the no-load state and data measured when the fuel cell operates in the load state, respectively, with a reference value.

In the aforementioned aspect of the present invention, changing the humidification state of a humidifier which supplies vapor to the fuel cell and a state of cooling water may include supplying the vapor to the fuel cell under condition where the temperature of the humidifier and the cooling water increase to 70° C.

In addition, changing the humidification state of a humidifier which supplies vapor to the fuel cell and a state of a cooling water may include supplying the vapor to the fuel cell under conditions where a relative humidity of the vapor supplied from the humidifier is 100%.

In addition, maintaining the load state while changing a flow rate of the vapor and gas supplied to the fuel cell may include supplying the vapor and gas to the fuel cell under conditions where the flow rate is 30 l/min~40 l/min.

In addition, maintaining the load state while changing a flow rate of the vapor and gas supplied to the fuel cell may include supplying a hydrogen gas to the fuel cell under conditions where a usage rate of the hydrogen gas is in the range of 1.2 to 1.4.

In addition, maintaining the load state while changing a flow rate of the vapor and gas supplied to the fuel cell may include supplying a voltage to the fuel cell under conditions where the voltage corresponds to a low voltage in the range of 0.1V to 0.4V.

In addition, maintaining the load state while changing a flow rate of the vapor and gas supplied to the fuel cell may include maximizing the flow rate provided in a pulse form to ensure a passage of a reactant gas.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Hereinafter, a method of activating a vehicle fuel cell according to an embodiment of the present invention will be described in detail with reference to the attached drawings.

Figure 1:
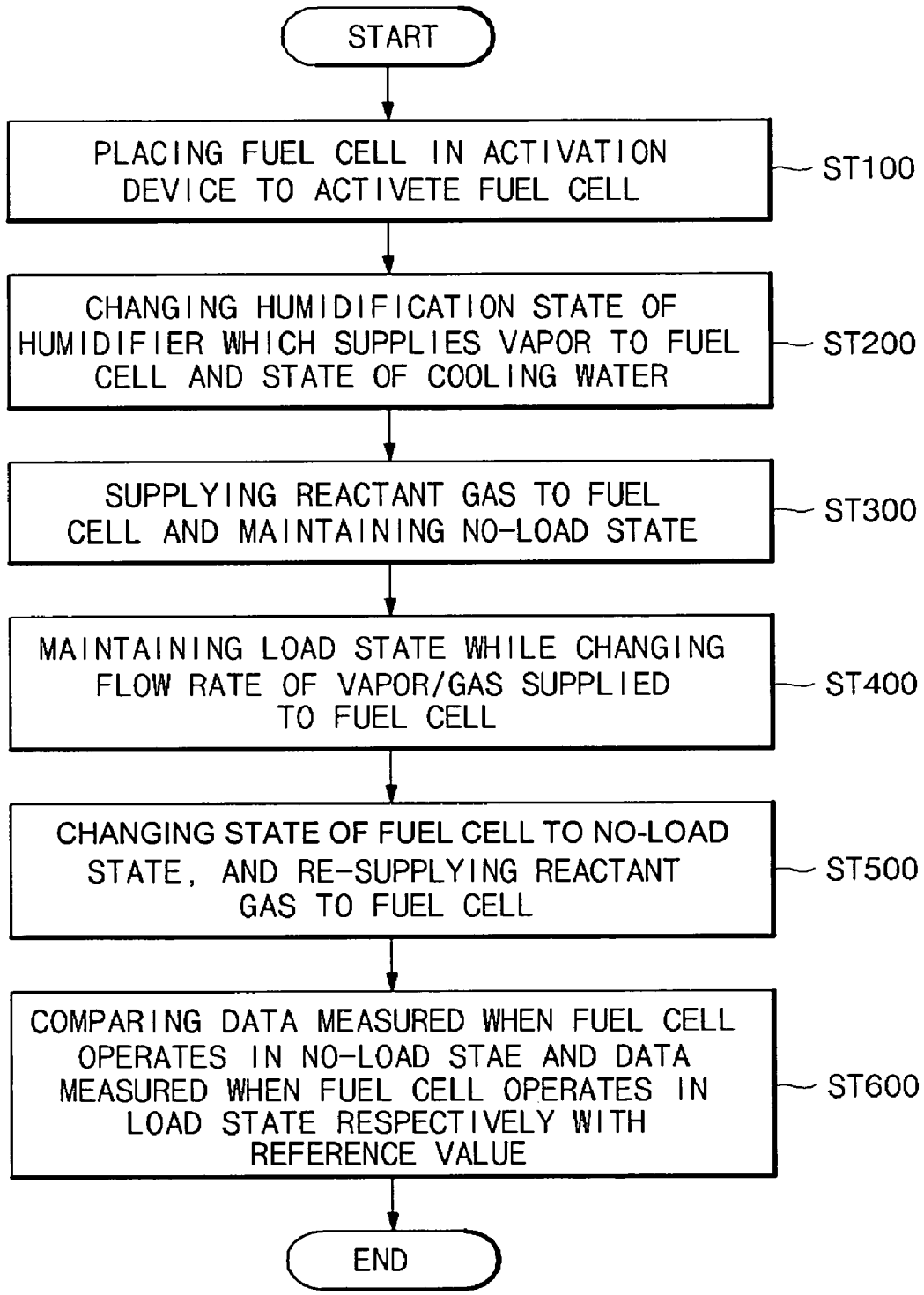
FIG. 1 is a flowchart illustrating a method of activating a vehicle fuel cell according to an embodiment of the present invention.

Referring to FIG. 1, the method includes: placing a fuel cell in an activation device so as to be activated (operation ST100); changing a humidification state of a humidifier which supplies vapor to the fuel cell and a state of a cooling water (operation ST200); supplying a reactant gas to the fuel cell and maintaining a no-load state (operation ST300); maintaining a load state while changing a flow rate of the vapor and gas supplied to the fuel cell (operation ST400); changing the state of the fuel cell to the no-load state, and re-supplying the reactant gas to the fuel cell (operation ST500); and comparing data measured when the fuel cell operates in the no-load state and data measured when the fuel cell operates in the load state, respectively, with a reference value (operation ST600).

Figure 2:
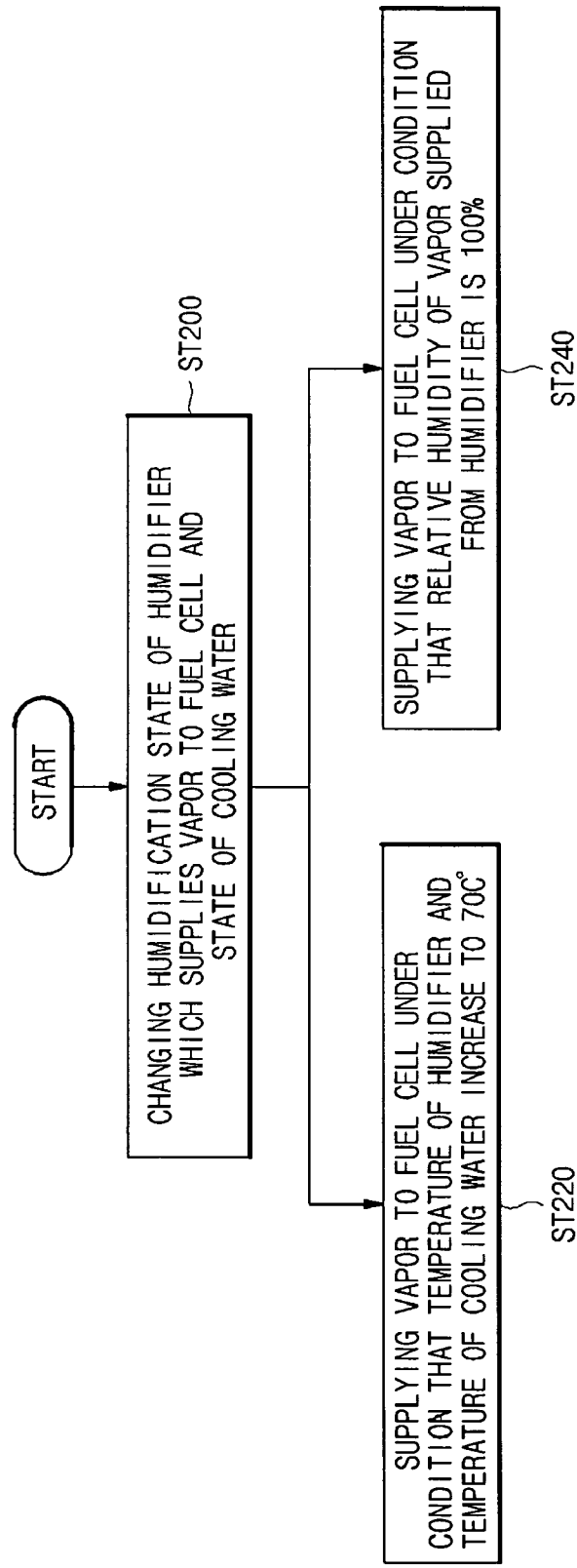
FIG. 2 is a flowchart illustrating operations of changing a humidification state and a cooling water state of the method of FIG. 1.

Referring to FIG. 2, the changing of a humidification state of a humidifier which supplies vapor to the fuel cell and a state of cooling water (operation ST200) includes supplying the vapor to the fuel cell under the condition that the temperature of the humidifier and the temperature of the cooling water increase to 70° C. (operation ST220).

In addition, the changing of a humidification state of a humidifier which supplies vapor to the fuel cell and a state of cooling water (operation ST200) further includes supplying the vapor to the fuel cell under the condition that a relative humidity of the vapor supplied from the humidifier is 100% (operation ST240).

Figure 3:
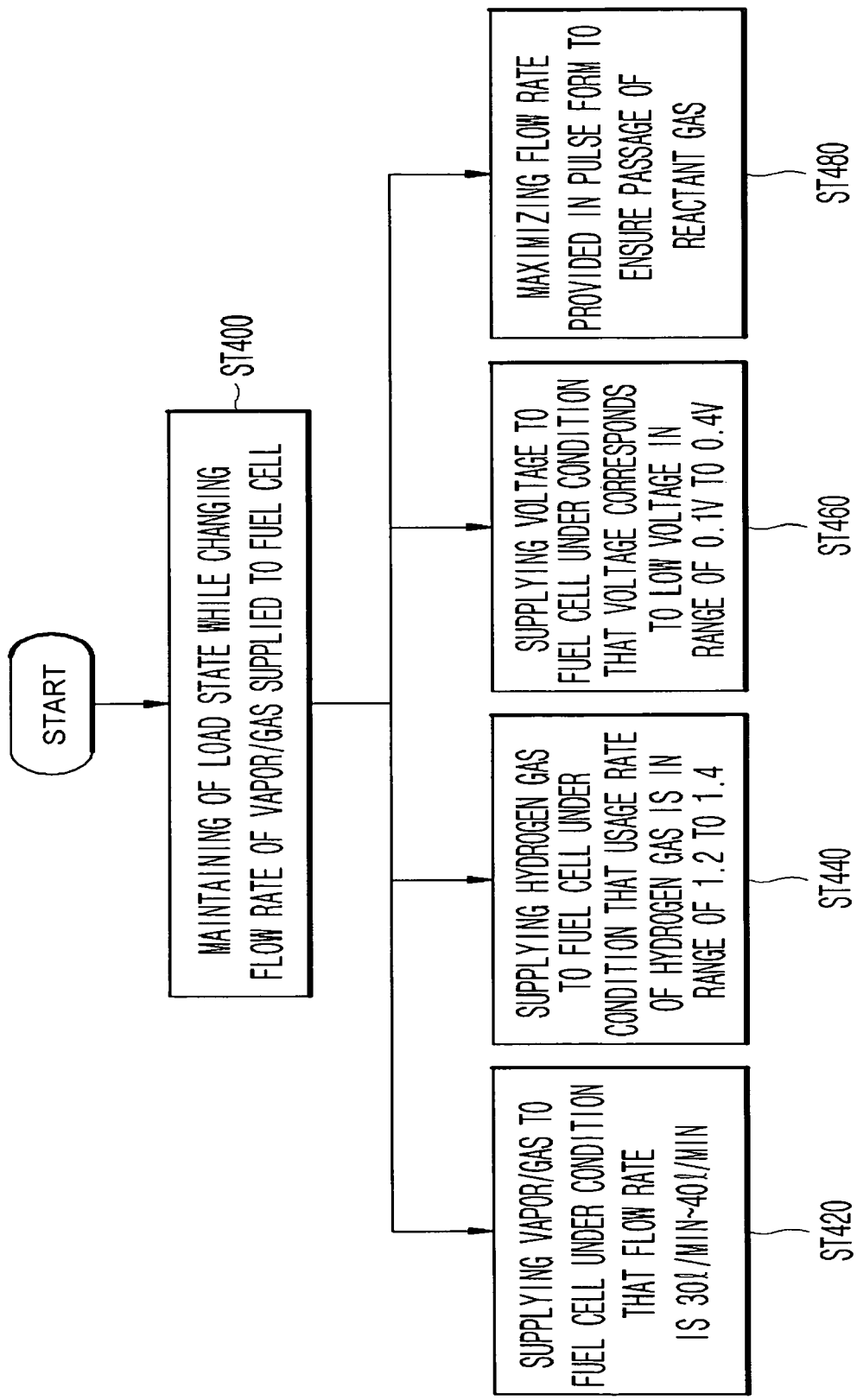
FIG. 3 is a flowchart illustrating operations of maintaining of a load state while changing a flow rate of a vapor and gas supplied to a fuel cell of the method of FIG. 1.
Figure 4:
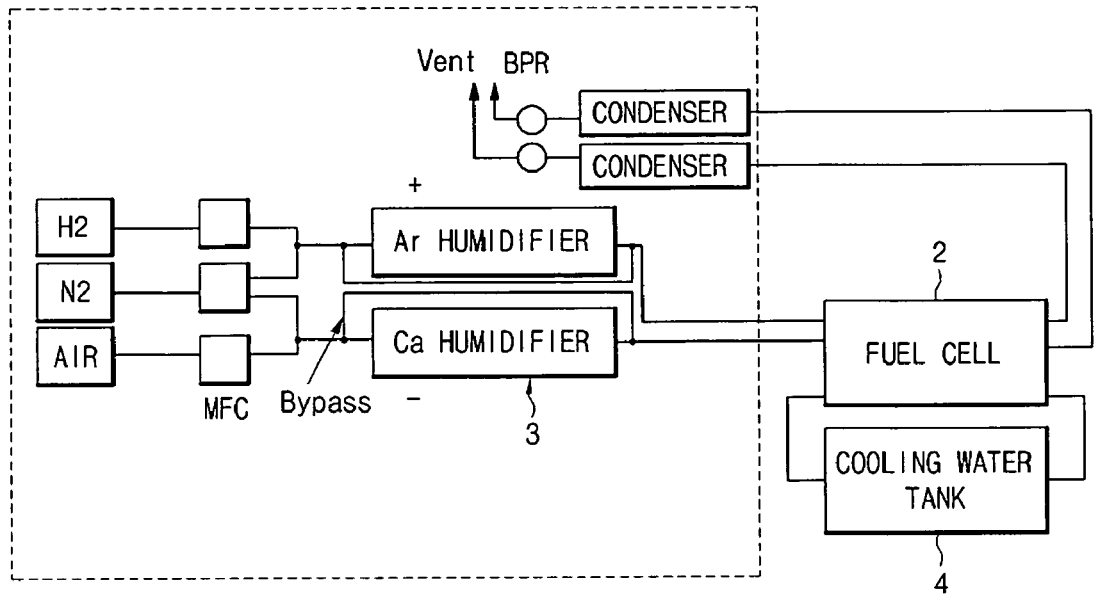
FIG. 4 is a block diagram of an activation device including a fuel cell used in the method of FIG. 1.

Referring to FIG. 3, the maintaining of a load state while changing a flow rate of the vapor and gas supplied to the fuel cell (operation ST400) may include supplying the vapor and gas to the fuel cell under the condition that the flow rate is 30 l/min~40 l/min (operation ST420). The maintaining of a load state while changing a flow rate of the vapor and gas supplied to the fuel cell (operation ST400) may further include supplying a hydrogen gas to the fuel cell under the condition that a usage rate of the hydrogen gas is in the range of 1.2 to 1.4 (operation ST440). The maintaining of a load state while changing a flow rate of the vapor and gas supplied to the fuel cell (operation ST400) may further include supplying a voltage to the fuel cell under the condition that the voltage corresponds to a low voltage in the range of 0.1V to 0.4V (operation ST460). The maintaining of a load state while changing a flow rate of the vapor and gas supplied to the fuel cell (operation ST400) may further include maximizing the flow rate provided in a pulse form to ensure a passage of a reactant gas (operation ST480).

Now, a method of activating a vehicle fuel cell according to an embodiment of the present invention will be described with reference to the following drawings.

Referring to FIGS. 1 to 4, a fuel cell 2 is placed in an activation device so as to be activated (operation ST100). A humidification state of a humidifier 3 which supplies vapor to the fuel cell 2 and a state of cooling water are changed (operation ST200). In this case, the vapor is supplied to the fuel cell 2 under the condition that the temperature of the humidifier 3 and the temperature of the cooling water increase to 70° C. The vapor is supplied to the fuel cell 2 under the condition that a relative humidity of the vapor supplied from the humidifier 3 is 100%. This is because an inner side of a cell included in the fuel cell 2 needs to be rapidly hydrated.

The fuel cell 2 is activated quickly if the cooling water in a cooling water tank 4 increases to 70° C. under the condition that the relative humidity is 100%, rather than the temperature of the fuel cell 2 itself increases.

This is because the fuel cell 2 has a high performance under the condition that an electrolyte (not shown) and an electrolyte membrane (not shown) in a catalyst layer (not shown) included in the fuel cell 2 can be sufficiently hydrated.

When a reactant gas (hydrogen/air) is supplied to the fuel cell 2, the fuel cell 2 maintains the no-load state (operation ST300), impurities of a gas channel inside a cell included in the fuel cell 2 is removed, and the cell maintains an equilibrium state. In this case, the hydrogen flows through a positive electrode, and the air flows through a negative electrode. As a result, an electrochemical reaction occurs.

The above electrochemical reaction occurs in a catalyst layer (not shown) in the fuel cell 2. Here, hydrogen is generated to be transferred through the electrolyte and the electrolyte membrane in the catalyst.

In particular, when the fuel cell 2 is initially driven after manufactured, the electrolyte membrane is dry. Therefore, the electrolyte and the electrolyte membrane in the catalyst layer are hydrated. Only after the electrolyte and the electrolyte membrane are sufficiently hydrated, passages through which hydrogen ions and a reactant reach the catalyst layer can be ensured. Thereafter, the load state is maintained while changing a flow rate of the vapor and gas supplied to fuel cell 2 (operation ST400).

The vapor and gas is supplied to the fuel cell 2 under the condition that the flow rate is 30 l/min~40 l/min (operation ST420). The reason why the flow rate increases is to lower the temperature of a gas discharged from the fuel cell 2, so that the amount of water stored in the cell can increase, and an inner side of the cell can be avoided from drying.

The hydrogen gas is supplied to the fuel cell 2 under the condition that a usage rate of the hydrogen gas is in the range of 1.2 to 1.4 (operation ST440).

If the hydrogen gas is supplied to the fuel cell 2 by variously changing the hydrogen usage rate, the cell can maintain a hydrate state, and the amount of water discharged along with a remaining gas through a discharge hole (not shown) can be minimized.

A voltage is supplied to the fuel cell 2 under the condition that the voltage corresponds to a low voltage in the range of 0.1V to 0.4V (operation ST460). By doing so, the hydration of the electrolyte and the electrolyte membrane in the catalyst layer can be promoted.

The flow rate provided in a pulse form is maximized to ensure a passage of a reactant gas (operation ST480). As a result, a partially blocked passage of the reactant gas can be ensured.

Thereafter, the state of the fuel cell 2 changes to the no-load state, and the reactant gas is re-supplied to the fuel cell 2

(operation ST500). In this state, a voltage supplied to the fuel cell 2 is turned off, and only a minimum reactant gas is supplied to the fuel cell 2. Operations ST300 and ST400 are repeated for about two hours.

The fuel cell 2 can be rapidly activated when the fuel cell 2 repeatedly changes its state from the no-load state to the load state.

Data (current-voltage) measured when the fuel cell 2 operates in the no-load state and data measured when the fuel cell 2 operates in the load state are respectively compared with a reference value (operation ST600). If the comparison result indicates that the data is in the range of 2 mV/cell which corresponds to the reference value suitable for completing activation, the fuel cell 2 is deemed to complete its activation, and the activation device is turned off.

Figure 5:
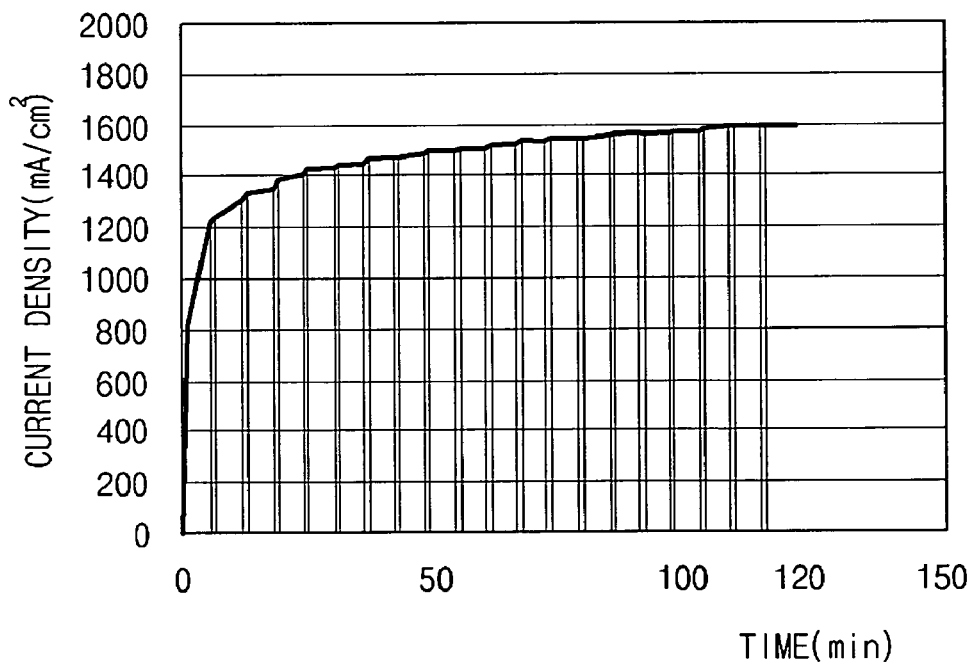
FIG. 5 is a graph illustrating a result obtained by a method of activating a vehicle fuel cell according to an embodiment of the present invention.

FIG. 5 is a graph illustrating a result obtained by a method of activating a vehicle fuel cell according to an embodiment of the present invention. Referring to FIG. 5, the fuel cell 2 is placed in the activation device so as to be activated. As a result, a current density measured in a cell included in the fuel cell 2 when two hours elapse after activation is carried out stays at 1600 mA/cm$^2$, thereby achieving activation.

Accordingly, the fuel cell can activated quickly, thereby increasing an output per hour when a stack is manufactured. Furthermore, hydrogen usage is reduced, thereby decreasing the production coat per stack.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method of activating a vehicle fuel cell, comprising:
    placing a fuel cell in an activation device so as to be activated;
    changing a humidification state of a humidifier which supplies vapor to the fuel cell and a state of cooling water;
    supplying a reactant gas to the fuel cell and maintaining a no-load state;
    maintaining a load state while changing a flow rate of the vapor and gas supplied to the fuel cell;
    changing the state of the fuel cell to the no-load state, and re-supplying the reactant gas to the fuel cell; and
    comparing data measured when the fuel cell operates in the no-load state and data measured when the fuel cell operates in the load state respectively with a reference value;
    wherein the maintaining of the load state while changing the flow rate of the vapor and gas supplied to the fuel cell comprises supplying the vapor and gas to the fuel cell at a flow rate of approximately 30 l/min~approximately 40 l/min.

2. The method of claim 1, wherein the changing of the humidification state the humidifier which supplies vapor to the fuel cell and the state of the cooling water comprises supplying the vapor to the fuel cell where the temperature of the humidifier and the temperature of the cooling water increase to approximately 70° C.

3. The method of claim 1, wherein the changing of the humidification state of the humidifier which supplies vapor to the fuel cell and the state of the cooling water comprises supplying the vapor to the fuel cell where a relative humidity of the vapor supplied from the humidifier is approximately 100%.

4. The method of claim 1, wherein the maintaining of the load state while changing the flow rate of the vapor and gas supplied to the fuel cell comprises supplying a hydrogen gas to the fuel cell where a usage ratio of the hydrogen gas is in the range of approximately 1.2 to approximately 1.4.

5. The method of claim 1, wherein the maintaining of the load state while changing the flow rate of the vapor and gas supplied to the fuel cell comprises supplying a voltage to the fuel cell in the range of approximately 0.1V to approximately 0.4V.

6. The method of claim 1, wherein the maintaining of the load state while changing the flow rate of the vapor and gas supplied to the fuel cell comprises maximizing the flow rate provided in a pulse form to ensure a passage of a reactant gas.

* * * * *